US009313612B2

(12) United States Patent
Burckart et al.

(10) Patent No.: US 9,313,612 B2
(45) Date of Patent: Apr. 12, 2016

(54) MOBILE WIRELESS ACCESS POINT GEOLOCATION SERVICES PROXY FOR MOBILE DEVICES

(71) Applicant: International Business Machines Corporation, Armonk, NY (US)

(72) Inventors: Eric J. Burckart, Raleigh, NC (US); Dinakaran Joseph, Apex, NC (US); Todd E. Kaplinger, Raleigh, NC (US); Victor S. Moore, Lake City, FL (US); Gregory L. Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 14/010,476

(22) Filed: Aug. 26, 2013

(65) Prior Publication Data

US 2015/0057022 A1 Feb. 26, 2015

(51) Int. Cl.
*H04W 24/00* (2009.01)
*H04W 4/02* (2009.01)
*H04W 88/08* (2009.01)

(52) U.S. Cl.
CPC ............... *H04W 4/02* (2013.01); *H04W 88/08* (2013.01)

(58) Field of Classification Search
CPC .............................. H04W 4/02; H04W 88/08
USPC ....................................................... 455/456.3
See application file for complete search history.

(56) References Cited

U.S. PATENT DOCUMENTS

| | | | |
|---|---|---|---|
| 6,865,538 B2* | 3/2005 | Chithambaram et al. ..... 705/1.1 |
| 7,382,771 B2* | 6/2008 | Leblanc et al. ............... 370/352 |
| 7,505,731 B2* | 3/2009 | Aaltonen et al. ............. 455/3.01 |
| 8,064,417 B2* | 11/2011 | Maki ............................. 370/338 |
| 8,831,605 B2* | 9/2014 | Kolding et al. ............. 455/435.1 |
| 2002/0176579 A1* | 11/2002 | Deshpande et al. .......... 380/270 |
| 2004/0179512 A1* | 9/2004 | Leblanc et al. ............... 370/352 |
| 2004/0203900 A1* | 10/2004 | Cedervall et al. .......... 455/456.1 |
| 2005/0227676 A1* | 10/2005 | De Vries .................... 455/414.1 |
| 2007/0082683 A1* | 4/2007 | Na et al. ...................... 455/456.1 |
| 2009/0156213 A1* | 6/2009 | Spinelli et al. ............... 455/436 |
| 2010/0064373 A1* | 3/2010 | Cai ......................... H04L 63/18 726/26 |
| 2010/0210280 A1* | 8/2010 | Haynes ................. G01S 5/0205 455/456.1 |
| 2011/0039522 A1* | 2/2011 | Partridge et al. ........... 455/414.1 |
| 2012/0022902 A1* | 1/2012 | Gressel et al. .................... 705/5 |

(Continued)

OTHER PUBLICATIONS

Sprint Overdrive 3G/4G Mobile Hot Spot, Apr. 1, 2010, p. 3.*
Overdrive Pro 3G/4G Mobile Hotspot by Sierra Wireless, Exclusively From Sprint, Delivers 4G Speeds to Millions of Wi-Fi Enabled Devices, Mar. 17, 2011, p. 2-4.*

(Continued)

*Primary Examiner* — Ajit Patel
(74) *Attorney, Agent, or Firm* — Steven M. Greenberg, Esq.; CRGO Law

(57) ABSTRACT

A method for mobile wireless access point geolocation services proxying for mobile devices is provided. The method includes providing in a wireless access point, a wireless hotspot for different mobile devices and establishing a cellular communications link between the wireless access point and the Internet. The method also includes routing messages between the mobile devices and the cellular communications link through the wireless hotspot. Finally, the method includes responding to a request from one of the mobile devices for geolocation data by obtaining location data for the wireless access point and transmitting the obtained location data to the one of the mobile devices over the wireless hotspot for use by the one of the mobile devices in acquiring location based services from a remote endpoint server over the Internet.

6 Claims, 1 Drawing Sheet

(56) References Cited

U.S. PATENT DOCUMENTS

| | | |
|---|---|---|
| 2012/0252482 A1 | 10/2012 | Peterson et al. |
| 2013/0231141 A1* | 9/2013 | Weinreich et al. ......... 455/456.3 |
| 2014/0018110 A1* | 1/2014 | Yoakum .................... 455/456.5 |
| 2014/0051392 A1* | 2/2014 | Isomaki et al. ............... 455/411 |
| 2014/0113657 A1* | 4/2014 | Chen .......................... 455/456.2 |
| 2014/0179339 A1* | 6/2014 | Hofleitner ............... H04W 4/02 455/456.1 |
| 2014/0242954 A1* | 8/2014 | Chang et al. ............... 455/414.1 |
| 2015/0031345 A1* | 1/2015 | Hyde et al. ................... 455/418 |

OTHER PUBLICATIONS

Overdrive 3G/4G Mobile Hotspot by Sierra Wireless Can Bring Sprint's 4G Speeds to More Than 400 Million Wi-Fi-Enabled Devices, Jan. 6 2010, p. 4.*

"Overdrive 3G/4G Movile Hotspot by Sierra Wireles Can Bring Sprint's 4G Speeds to More Than 400 Million Wi-Fi-Enabled Devices", Jan. 6, 2010, Sierrawireless.com/newsroom.*

"Overdrive Pro 3G/4G Mobile Hotspot by Sierra Wireless, Exclusively From Sprint Delivers 4G Speeds to Millions of Wi-Fi Enabledd Devices", Mar. 17, 2011, sierrawireless.com/newsroom.*

* cited by examiner

MOBILE WIRELESS ACCESS POINT GEOLOCATION SERVICES PROXY FOR MOBILE DEVICES

BACKGROUND OF THE INVENTION

1. Field of the Invention

The present invention relates to location based services and more particularly to geolocation for location based services.

2. Description of the Related Art

Geolocation is the identification of the real-world geographic location of an object, such as a radar, mobile phone or an Internet-connected computer terminal. In the context of mobile computing, geolocation refers to the determination of a geographic location of a computing device. The result of geolocation oftentimes is a set of geographical coordinates, but also can include a translated form of geographical coordinates such as the name of a location, an address of a location, or a location in reference to one or more landmarks.

Global positioning technology such as the global positioning system (GPS) in many instances can provide the raw coordinate data necessary to produce a resultant geographical location. However, other methodologies of geolocation can include radio frequency (RF) location such as time difference of arrival (TDOA), direction finding along a bearing, and computer protocol location in which a geographic location is associated with an Internet Protocol (IP) address, a media access control (MAC) address, an radio frequency identifier (RFID), hardware embedded article/production number, an embedded software number, an invoice, a Wi-Fi positioning system, or even user supplied location information.

Modern mobile devices may support one or more methodologies of geolocation—especially GPS. Yet, some mobile devices are resource constrained and do not include a GPS receiver limiting those devices to the more granular technique of computer protocol location. Even then, some mobile devices are so resource constrained as to not afford the requisite firmware to perform computer protocol location. Or, as is the case in many circumstances, computer protocol location may not be enabled by the end user, either knowingly, or more commonly unknowingly. In the latter circumstance, the advantage of geolocation and the use thereof in location based services cannot be realized.

BRIEF SUMMARY OF THE INVENTION

Embodiments of the present invention address deficiencies of the art in respect to geolocation services for mobile devices and provide a novel and non-obvious mobile wireless access point geolocation services proxy for mobile devices. In an embodiment of the invention, a method for mobile wireless access point geolocation services proxying for mobile devices is provided. The method includes providing in a wireless access point, a wireless hotspot for different mobile devices and establishing a cellular communications link between the wireless access point and the Internet. The method also includes routing messages between the mobile devices and the cellular communications link through the wireless hotspot. Finally, the method includes responding to a request from one of the mobile devices for geolocation data by obtaining location data for the wireless access point and transmitting the obtained location data to the one of the mobile devices over the wireless hotspot for use by the one of the mobile devices in acquiring location based services from a remote endpoint server over the Internet.

In another embodiment of the invention, a mobile wireless access point is provided. The mobile wireless access point includes at least one processor, memory and a cellular radio disposed within a housing, the cellular radio providing a broadband data connection to the Internet. The mobile wireless access point also includes a wireless router coupled to the processor, memory and cellular radio within the housing and configured to generate and maintain a wireless hotspot within a geographic distance of the housing and to route data from the wireless hotspot to the Internet over the broadband data connection. Finally, the mobile wireless access point can include a geolocation proxy module executing in the memory of the housing. The module includes program code enabled upon execution by the at least one processor in the housing to respond to a request from a computing device communicatively linked to the mobile wireless access point through the wireless hotspot for geolocation data, to obtain location data for the mobile wireless access point and to transmit the obtained location data to the one of the mobile devices over the wireless hotspot for use by the computing device in acquiring location based services from a remote endpoint server over the Internet.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for mobile wireless access point geolocation services proxying for mobile devices. In accordance with an embodiment of the invention, a mobile wireless access point can establish a cellular data connection with a remote server over both a cellular communications network and the Internet. Also, the mobile wireless access point can establish a wireless hotspot through which different mobile devices can maintain a wireless communications link with respectively different hosts disposed about the Internet. Thereafter, the mobile wireless access point can perform geolocation in respect to the mobile wireless access point and provide a result set of geographic coordinates to requesting ones of the mobile devices within the hotspot so that location based services can be provided by the hosts to the mobile devices utilizing the geographic coordinates provided by the mobile wireless access point.

Figure 1:
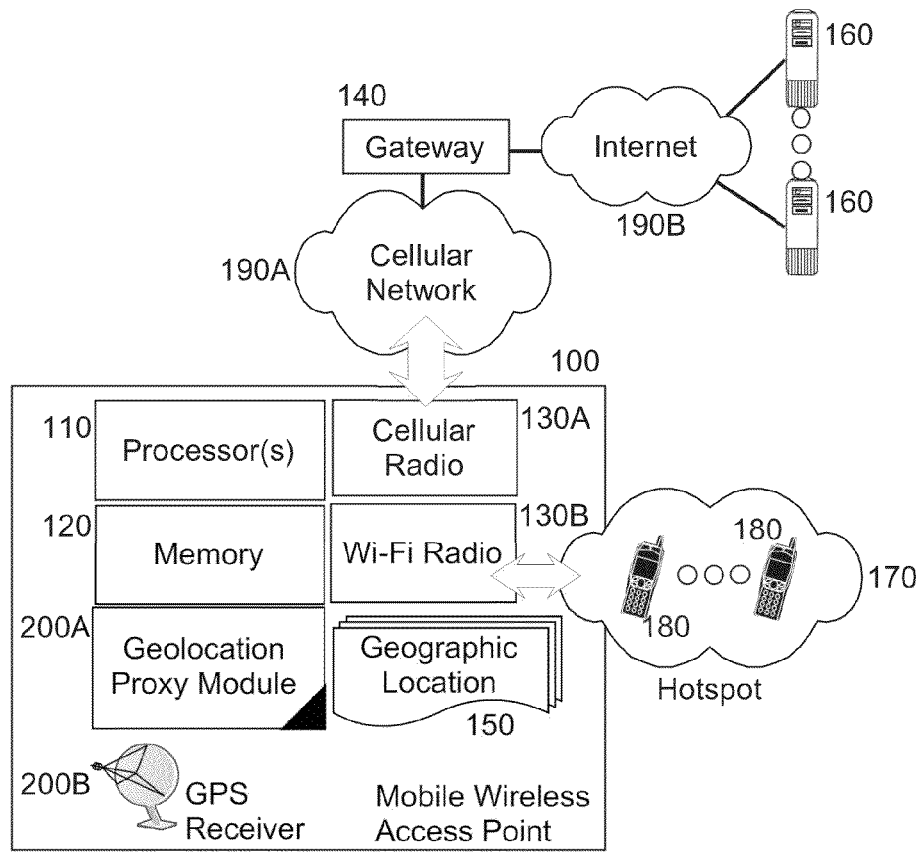
FIG. 1 is a pictorial illustration of a computing architecture configured for mobile wireless access point geolocation services proxying for mobile devices; and, FIG. 2 is a flow chart illustrating a process mobile wireless access point geolocation services proxying for mobile devices.

In further illustration, FIG. 1 pictorially shows a computing architecture configured for mobile wireless access point geolocation services proxying for mobile devices. As shown in FIG. 1, a mobile wireless access point 100 can include a housing enclosing at least one processor 110, memory 120, a cellular radio 130A and a wireless networking radio 130B. The cellular radio 130A can be configured to establish and maintain a cellular telephonic connection to a cellular network 190A and to process data communications therethrough from the mobile wireless access point 100 to one or more remote endpoint servers 160 disposed about the Internet 190B, by way of a network gateway 140.

The wireless networking radio 130B in turn can be configured to establish and maintain a wireless hotspot 170 within a limited geographic distance of the mobile wireless access point 100. Within the hotspot 170, short range wireless data communications can be managed between coupled computing devices 180, for example laptop computers, personal computers, personal digital assistants, tablet computers, smartphones and the like. Further, within the hotspot 170, data communications can be managed between individual ones of the computing devices 180 and the remote endpoint servers 160 through the cellular network 190A and the Internet 190B.

Of note, a geolocation proxy module 200A can be disposed within the mobile wireless access point 100, for example within firmware or other persistent memory of the mobile wireless access point 100. The module 200A can include program code that when loaded into memory 120 and executed by the processor(s) 110 is enabled to act as a proxy for geolocation of the computing devices 180. Specifically, the program code can permit a subscription by individual ones of the computing devices 180 requiring geolocation proxying, and to respond to a request by one of the subscribing computing devices 180 for a geographic location by acquiring a geographic location 150 from a GPS receiver 200B or by utilizing an alternate mechanism for acquiring a geographic location 150 such as RF location or computer protocol location.

Thereafter, the program code can provide the geographic location 150 to the requesting one of the computing devices 180. The requesting one of the computing devices 180 in turn can provide the geographic location 150 to a corresponding one of theremote endpoint servers 160 in order to receive from the corresponding one of the remote endpoint servers 160 location based services.

Figure 2:
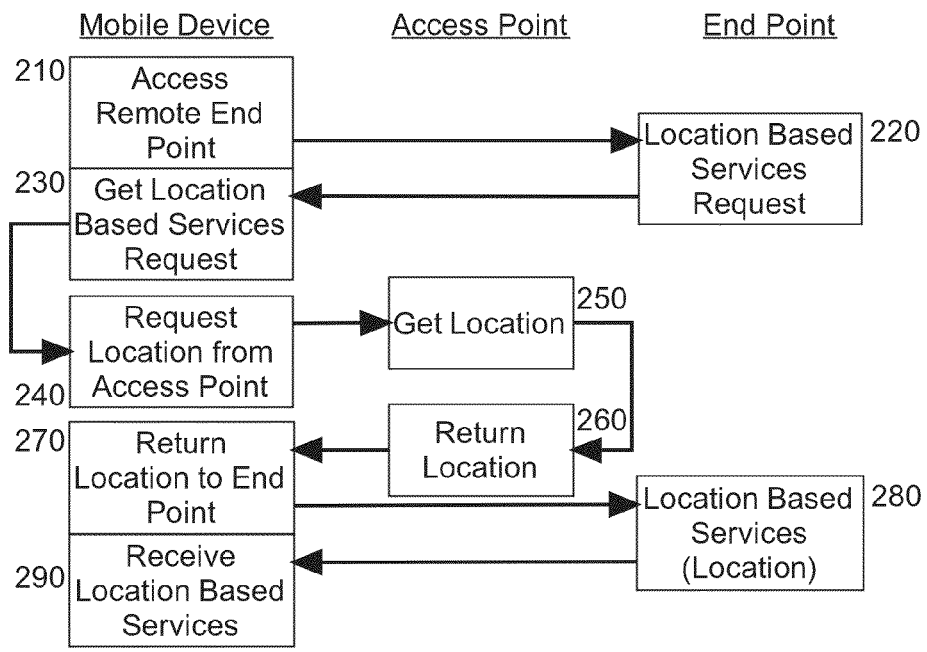

In yet further illustration of the operation of the program code of the geolocation proxy module 200A, FIG. 2 is a flow chart depicting a process for mobile wireless access point geolocation services proxying for mobile devices. The process can begin in block 210 with the accessing by a mobile computing device of a remote endpoint server by way of a mobile access point. In block 220, the remote endpoint server can offer location based services to the mobile computing device. In block 230, mobile computing device can receive the offer of location based services and in block 240 can request location data, for example GPS coordinates, from the mobile wireless access point. In block 250 the mobile wireless access point can acquire the requested location data, for example through a GPS receiver or by way of RF location or computer protocol location, and in block 260 the location data can be returned to the mobile computing device.

In block 270, the location data received from the mobile wireless access point can be in turn provided to the remote endpoint server by way of the mobile wireless accessing point. In block 280 the remote endpoint server can process the received location data in order to provide location based services to the mobile computing device. Finally, in block 290, the mobile computing device can receive the location based services provided by the remote endpoint server.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for mobile wireless access point geolocation services proxying for mobile devices, the method comprising:

providing, at a mobile wireless access point, a wireless hotspot within a geographic distance of the mobile wireless access point for a plurality of different mobile devices;

establishing, at the mobile wireless access point, a cellular broadband communications link between the mobile wireless access point and the Internet;

routing messages, at the mobile wireless access point, between the mobile devices and the cellular broadband communications link through the wireless hotspot to the Internet; and, responsive to a request from one of the mobile devices for geolocation data, from the mobile wireless access point, obtaining geolocation data determined by at least one location determining component disposed within the mobile wireless access point for the mobile wireless access point and transmitting the obtained geolocation data to the one of the mobile devices over the wireless hotspot for use by the one of the mobile devices in acquiring location based services from a remote endpoint server over the Internet.

2. The method of claim 1, wherein the mobile wireless access point obtains the location data through a global positioning services (GPS) receiver disposed within the wireless mobile access point.

3. The method of claim 1, wherein the one of the mobile devices subscribes to the mobile wireless access point for geolocation services proxying.

4. A mobile wireless access point comprising:

at least one processor, memory and a cellular radio disposed within a housing, the cellular radio providing a broadband data connection to the Internet;

a wireless router coupled to the processor, memory and cellular radio within the housing and configured to generate and maintain a wireless hotspot within a geographic distance of the housing and to route data from the wireless hotspot to the Internet over the broadband data connection; and, a geolocation proxy module executing in the memory of the housing, the module comprising program code enabled upon execution by the at least one processor in the housing to respond to a request from a computing device communicatively linked to the mobile wireless access point through the wireless hotspot for geolocation data, from the mobile wireless access point, to obtain geolocation data determined by at least one location determining component disposed within the wireless access point for the mobile wireless access point and to transmit the obtained geolocation data to the computing device over the wireless hotspot for use by the computing device in acquiring location based services from a remote endpoint server over the Internet.

5. The mobile wireless access point of claim 4, wherein the wireless mobile access point obtains the location data through a global positioning services (GPS) receiver disposed within the wireless mobile access point.

6. The mobile wireless access point of claim 4, wherein the computing device subscribes to the mobile wireless access point for geolocation services proxying.

\* \* \* \* \*